United States Patent
Li et al.

(10) Patent No.: US 11,490,505 B2
(45) Date of Patent: Nov. 1, 2022

(54) METHOD FOR REDUCING INFLUENCE OF REMOTE REFERENCE POWER NOISE ON SIGNAL QUALITY

(71) Applicant: INSPUR SUZHOU INTELLIGENT TECHNOLOGY CO., LTD., Jiangsu (CN)

(72) Inventors: Deheng Li, Jiangsu (CN); Fazhi Liu, Jiangsu (CN); Minzheng Tian, Jiangsu (CN); Ning Wu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/615,228

(22) PCT Filed: Nov. 27, 2019

(86) PCT No.: PCT/CN2019/121112
§ 371 (c)(1),
(2) Date: Nov. 30, 2021

(87) PCT Pub. No.: WO2021/017344
PCT Pub. Date: Feb. 4, 2021

(65) Prior Publication Data
US 2022/0151057 A1    May 12, 2022

(30) Foreign Application Priority Data
Aug. 1, 2019 (CN) .......................... 201910706556.5

(51) Int. Cl.
*H05K 1/02* (2006.01)
*H05K 13/08* (2006.01)
*H05K 3/30* (2006.01)

(52) U.S. Cl.
CPC ............. *H05K 1/0231* (2013.01); *H05K 3/30* (2013.01); *H05K 13/082* (2018.08); *H05K 2201/10015* (2013.01)

(58) Field of Classification Search
CPC ............... H05K 13/082; H05K 1/0231; H05K 2201/10015; H05K 3/30
See application file for complete search history.

(56) References Cited

U.S. PATENT DOCUMENTS

| 7,795,728 B2 * | 9/2010 | Przadka ............... H03H 9/0557 361/811 |
| 2001/0048592 A1 | 12/2001 | Ninomiya |

(Continued)

FOREIGN PATENT DOCUMENTS

| CN | 1326312 A | 12/2001 |
| CN | 101932192 A | 12/2010 |

(Continued)

OTHER PUBLICATIONS

International Search Report and English Translation PCT/CN2019/121112 dated Apr. 23, 2020, 6 pages.

(Continued)

*Primary Examiner* — Minh N Trinh
(74) *Attorney, Agent, or Firm* — Cooper Legal Group LLC

(57) ABSTRACT

A method for reducing influence of a remote reference power noise on signal quality is provided. A remote reference power plane connected to a power module is identified according to a schematic diagram of signal design, and a noised power plane is determined. A position of the noised power plane is found in a PCB, and whether the noised power plane is remote referenced by a high-speed signal is judged. Placement positions and number of connection capacitors are determined according to a layout and routing position of the high-speed signal and a width of the noised (Continued)

power plane. Two capacitors with fixed capacitance values are placed at the placement positions of the connection capacitors. Connection capacitors are added to a position of a noised remote reference power plane of a signal line for connecting the power plane and the ground.

7 Claims, 4 Drawing Sheets

(56) References Cited

U.S. PATENT DOCUMENTS

| | | |
|---|---|---|
| 2002/0014915 A1 | 2/2002 | Ishikawa et al. |
| 2002/0017907 A1 | 2/2002 | Araki et al. |
| 2010/0039784 A1* | 2/2010 | Hayashi ............... H05K 1/0234 361/783 |
| 2010/0321910 A1 | 12/2010 | Hsu et al. |
| 2017/0086289 A1* | 3/2017 | Takahashi ............... H02M 1/14 |
| 2022/0151057 A1* | 5/2022 | Li ........................ H05K 1/0231 |

FOREIGN PATENT DOCUMENTS

| | | |
|---|---|---|
| CN | 102340926 A | 2/2012 |
| CN | 105162318 A | 12/2015 |
| CN | 110622402 A | 12/2019 |

OTHER PUBLICATIONS

Written Opinion and English Translation PCT/CN2019/121112 dated Apr. 23, 2020, 7 pages.

First Office Action for priority application CN201910706556.5 dated May 18, 2020, 14 pages.

* cited by examiner

US 11,490,505 B2

METHOD FOR REDUCING INFLUENCE OF REMOTE REFERENCE POWER NOISE ON SIGNAL QUALITY

RELATED APPLICATION

The present application claims priority to Chinese Patent Application No. 201910706556.5, filed to the China Patent Office on Aug. 1, 2019, and entitled "Method and System for Reducing Influence of Remote Reference Power Noise on Signal Quality", the disclosure of which is hereby incorporated by reference in its entirety.

TECHNICAL FIELD

The present application belongs to the technical field of electronic design, and particularly relates to a method and system for reducing influence of a remote reference power noise on signal quality.

BACKGROUND ART

In the field of electronic design, a circuit board is a physical carrier of all electronic design contents. Therefore, the intention of electronic design is realized through the circuit board, so the circuit board design is an indispensable link in any electronic device. The circuit board design is divided into two parts: signal design and power design. The power design is the design basis of the whole circuit board, and all chips can be normally operated by a stable power supply. The signal design is the soul of the circuit board design. The realization of various functions needs to be controlled by signals. The quality of the signal design is related to the realization and stability of various functions of the circuit board. Traditional signal integrity design methods have a clear requirement for a near-end reference of high-speed signals, but there is no guidance document for a remote reference. However, when there is noise in a remote reference plane, the influence on the high-speed signals will not be negligible, sometimes even influencing the transmission of the signals.

FIG. 1 illustrates a schematic diagram of reducing influence of a remote reference plane in the conventional art. A signal layer is arranged in the middle, a near-end reference plane is arranged on an upper side, and a remote reference plane is arranged on a lower side. A distance between a signal and the near-end reference plane is H, and a distance between the signal and the remote reference plane is designed as 3 H, so as to reduce the influence of the remote reference plane as much as possible. At the present stage, there are no relevant requirements for whether the remote reference plane is designed as the ground or a power supply and whether the noise of the power supply is excessive. There are certain design limitations in the conventional art. When the remote reference plane is a power layer plane with a large noise, the power noise may interfere with the signal of the signal layer, and may even cause false triggering of the signal, thereby influencing the quality of high-speed or low-speed signals.

SUMMARY OF THE INVENTION

The present application proposes a method and system for reducing influence of a remote reference power noise on signal quality. Connection capacitors are added to a position of a power remote reference plane for connecting the power remote reference plane and the ground. Most of a power noise is filtered out, so that the influence on signals is reduced.

In order to achieve the above object, the present application proposes a method and system for reducing influence of a remote reference power noise on signal quality. The method includes the following steps:

S1: identifying a remote reference power plane connected to a power module according to a schematic diagram of signal design, determining a noised power plane, finding a position of the noised power plane in a printed circuit board (PCB), and judging whether the noised power plane is remote referenced by a high-speed signal;

S2: determining placement positions and number of connection capacitors according to a layout and routing position of the high-speed signal and a width of the noised power plane; and S3: placing two capacitors with fixed capacitance values at the placement positions of the connection capacitors.

Further, in step S1, an oscilloscope is selected for measurement at a switch directly connected to a switch power chip pin, and if an oscillating voltage is greater than 10% of a switch power chip voltage, a noised power plane is determined.

Further, in step S1, an oscilloscope is selected for measurement at a switch directly connected to a switch power chip pin, and if a voltage amplitude jumps and a rising edge rate is greater than 0.3 V/ns, a noised power plane is determined.

If there is a voltage oscillation during conversion and an oscillation frequency is between 100 kHz and 1 GHz, a noised power plane is determined.

Further, in step S2, the method for determining placement positions and number of connection capacitors according to a layout and routing position of the high-speed signal and a width of the noised power plane includes:

placing, according to determined positions of a high-speed signal line and a remote reference plane, in order to ensure the quality of the high-speed signal line, connection capacitors on layer L1 within a range of 80 mils perpendicular to the farthest end of the high-speed signal line, and placing a pair of connection capacitors per 300 mils according to the width of the noised power plane, the connection capacitors being configured to connect the noised power plane and the ground.

Further, in step S3, the two capacitors have fixed capacitance values of 0.01 µF and 0.1 µF, respectively.

Further, the connection capacitors are placed beside the high-speed signal line, the connection capacitors are located on layer L1 for connecting the remote reference power plane and the ground, the high-speed signal line is located on layer L7, the ground layer is located on layer L6, and the remote reference power plane is located on layer L8.

The present application also proposes a system for reducing influence of a remote reference power noise on signal quality, including an identification and judgment module, a determination module and a placement module.

The identification and judgment module is configured to identify a remote reference power plane connected to a power module according to a schematic diagram of signal design, determine a noised power plane, find a position of the noised power plane in a PCB, and judge whether the noised power plane is remote referenced by a high-speed signal.

The determination module is configured to determine placement positions and number of connection capacitors according to a layout and routing position of the high-speed signal and a width of the noised power plane.

The placement module is configured to place two capacitors with fixed capacitance values at the placement positions of the connection capacitors.

Further, the identification and judgment module includes an identification module and a judgment module.

The identification and judgment module includes an identification module and a judgment module.

The identification module is configured to identify a remote reference power plane connected to a power module according to a schematic diagram of signal design, and determine a noised power plane.

The judgment module is configured to find a position of the noised power plane in a PCB, and judge whether the noised power plane is remote referenced by a high-speed signal.

Further, the determination module includes a first determination module and a second determination module.

The first determination module is configured to place, according to determined positions of a high-speed signal line and a remote reference plane, in order to ensure the quality of the high-speed signal line, connection capacitors on layer L1 within a range of 80 mils perpendicular to the farthest end of the high-speed signal line.

The second determination module is configured to place a pair of connection capacitors per 300 mils according to the width of the noised power plane. The connection capacitors are configured to connect the noised power plane and the ground.

The effects provided in the Summary of the Invention are only the effects of embodiments, not all the effects of the application, and one of the above technical solutions has the following advantages or beneficial effects.

Embodiments of the present application propose a method and system for reducing influence of a remote reference power noise on signal quality. In the method, a remote reference power plane connected to a power module is firstly identified according to a schematic diagram of signal design, a noised power plane is determined, and a position and name of the noised power plane are recorded. The position of the noised power plane is found in a PCB, and whether the noised power plane is remote referenced by a high-speed signal is judged. Then, placement positions and number of connection capacitors are determined according to a layout and routing position of the high-speed signal and a width of the noised power plane. According to determined positions of a high-speed signal line and a remote reference plane, in order to ensure the quality of the high-speed signal line, connection capacitors are placed on layer L1 within a range of 80 mils perpendicular to the farthest end of the high-speed signal line, and a pair of connection capacitors are placed per 300 mils according to the width of the noised power plane. The connection capacitors are configured to connect the noised power plane and the ground. Finally, two capacitors with fixed capacitance values are placed at the placement positions of the connection capacitors. Based on the method for reducing the influence of the remote reference power noise on the signal quality proposed by the present application, a system for reducing influence of a remote reference power noise on signal quality is also proposed. In the present application, a noised power plane is determined by judging a noise position. Then, connection capacitors are added to a position of a noised remote reference power plane of a signal line for connecting the power plane and the ground. Most of a power noise is filtered out through the connection capacitors, the influence of a signal remote reference power plane noise on signal quality is reduced, and the signal integrity is improved.

DETAILED DESCRIPTION OF THE INVENTION

Figure 1:
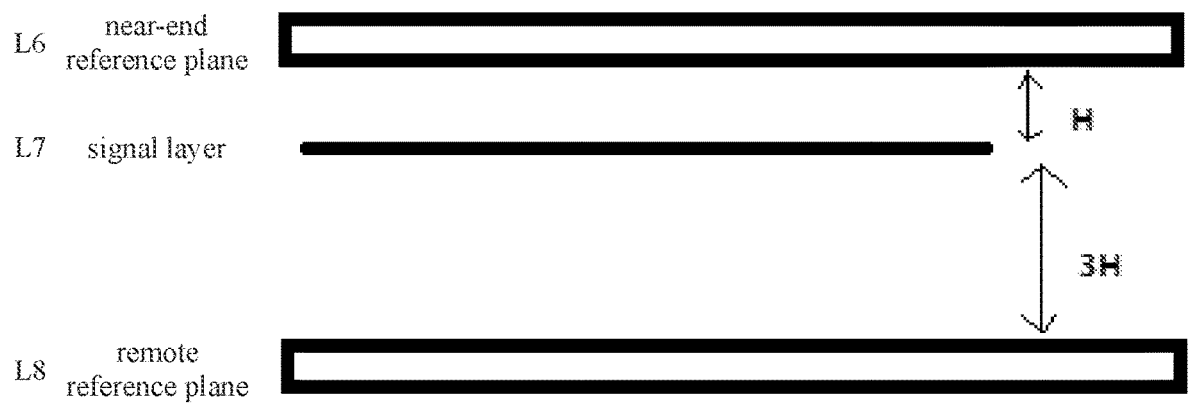
FIG. 1 illustrates a schematic diagram of reducing influence of a remote reference plane in the conventional art.

The technical solutions in the embodiments of the present application will now be clearly and completely described with reference to the accompanying drawings in the embodiments of the present application. It is apparent that the described embodiments are only a part of the embodiments of the present application, not all of the embodiments. Based on the embodiments in the present application, all the other embodiments obtained by those of ordinary skill in the art without involving any inventive effort may fall within the protection scope of the present application.

In the description of the present application, it should be understood that orientation or positional relationships indicated by the terms "longitudinal", "transverse", "upper", "lower", "front", "rear", "left", "right", "vertical", "horizontal", "top", "bottom", "inner", "outer", etc. are orientation or positional relationships shown in the drawings, are merely for convenience in describing the present application, and do not indicate or imply that the referenced devices or elements must have a particular orientation, be constructed and operated in a particular orientation, and thus are not to be construed as limiting the present application.

Embodiment 1

Embodiment 1 of the present application proposes a method and system for reducing influence of a remote reference power noise on signal quality. In the method, a remote reference power plane connected to a power module is firstly identified according to a schematic diagram of signal design, a noised power plane is then determined, and a position and name of the noised power plane are recorded. Then, the position of the noised power plane is found in a PCB, and whether the noised power plane is remote referenced by a high-speed signal is judged.

Then, placement positions and number of connection capacitors are judged according to a layout and routing position of the high-speed signal and a width of the noised power plane.

Finally, two capacitors with fixed capacitance values are placed at the placement positions of the connection capacitors.

Figure 2:
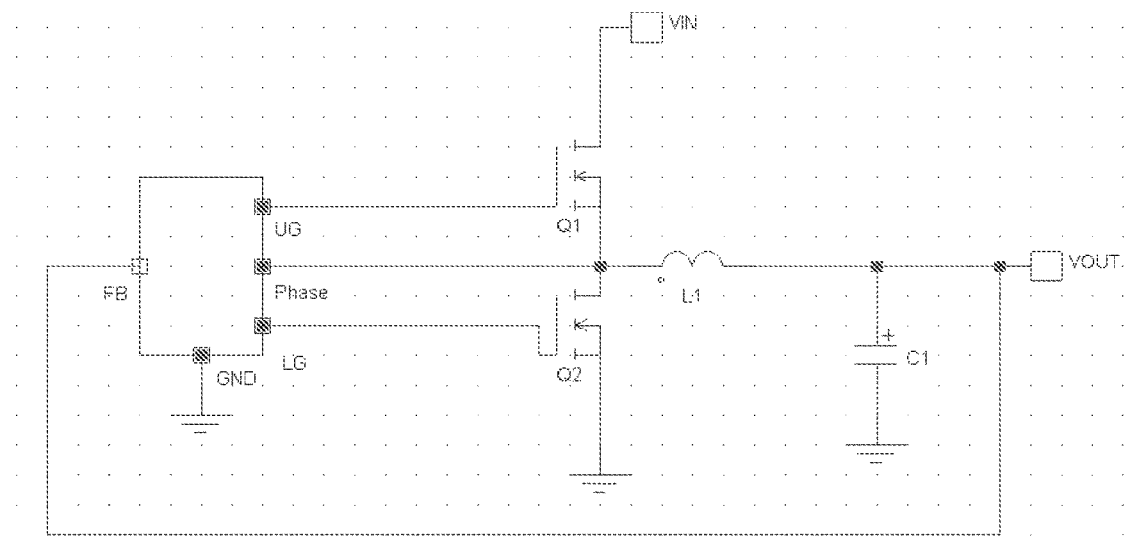
FIG. 2 illustrates a schematic diagram of signal design according to Embodiment 1 of the present application.

FIG. 2 illustrates a schematic diagram of signal design according to Embodiment 1 of the present application. A PCB has a power plane with a large voltage, such as 12V and 5V. Power planes directly connected to a power chip are voltage in (VIN), phase and ground (GND) respectively. GND is GND connected to Q2 in the figure. As a power supply switches all the time, there will be some oscillation of voltage around the circle in the figure.

An oscilloscope with a bandwidth of 10 GHz is selected for measurement at a voltage oscillation in the schematic diagram. If an oscillating voltage is greater than 10% of a switch power chip voltage, a noised power plane is determined.

Figure 3:
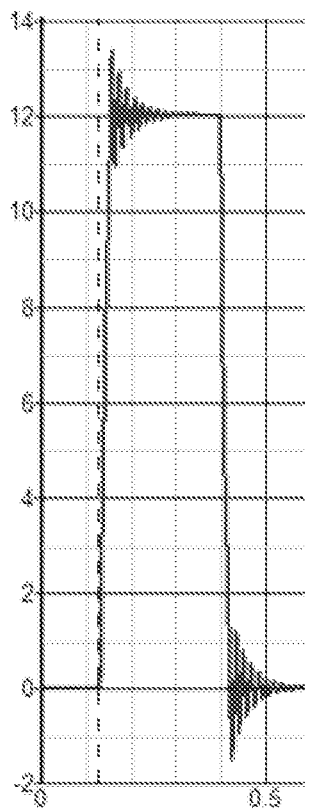
FIG. 3 illustrates a waveform diagram of noise in voltage amplitude jumping in Embodiment 1 of the present application.

FIG. 3 illustrates a waveform diagram of noise in voltage amplitude jumping in Embodiment 1 of the present application. If a voltage amplitude jumps and a rising edge rate is greater than 0.3 V/ns, a noised power plane is determined. If there is a voltage oscillation during conversion and an oscillation frequency is within a range of 100 kHz to 1 GHz, it is considered that there is noise.

Figure 4:
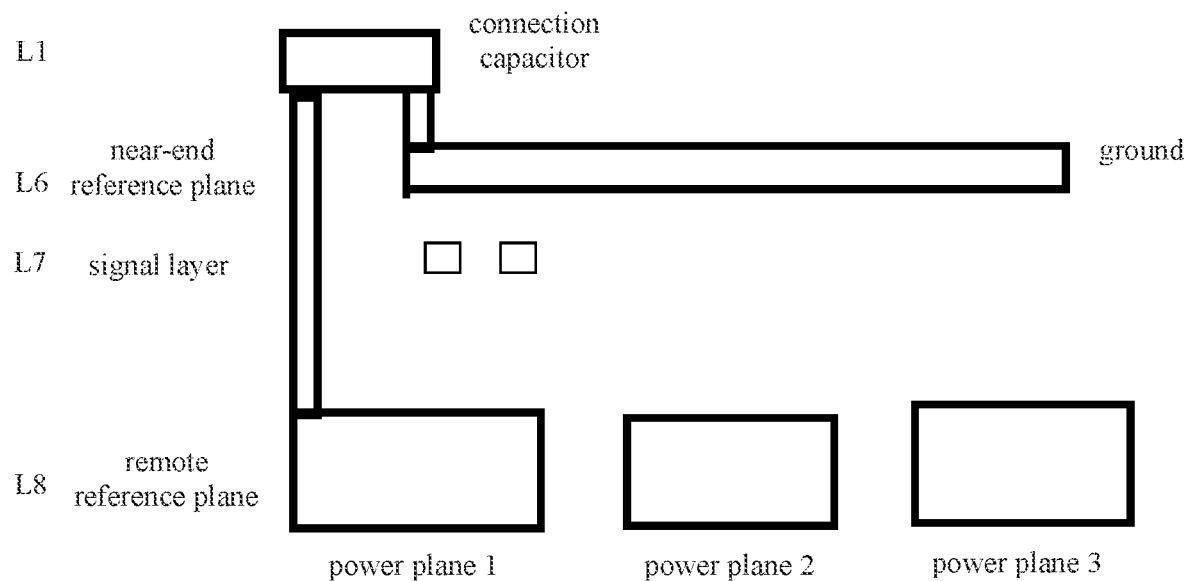
FIG. 4 illustrates a schematic diagram of reducing influence of a remote reference power noise on signal quality according to Embodiment 1 of the present application.

FIG. 4 illustrates a schematic diagram of reducing influence of a remote reference power noise on signal quality according to Embodiment 1 of the present application. A signal layer has a pair of differential signals, the ground is referenced at a near end, power plane 1 is remote referenced, power plane 1 has a large noise, and the remote reference plane also include power planes such as power plane 2 and power plane 3. A connection capacitor is added to a position of the remote reference power plane 1 of a signal line for connecting power plane 1 and the ground. Most of a power noise is filtered out through the connection capacitor, so that the influence thereof on signals is reduced. The connection capacitors are placed beside the high-speed signal line, the connection capacitors are located on layer L1 for connecting the remote reference power plane and the ground, the high-speed signal line is located on layer L7, the ground layer is located on layer L6, and the remote reference power plane is located on layer L8.

The method for judging placement positions and number of connection capacitors according to a layout and routing position of the high-speed signal and a width of the noised power plane includes: placing, according to determined positions of a high-speed signal line and a remote reference plane, in order to ensure the quality of the high-speed signal line, connection capacitors on layer L1 within a range of 80 mils perpendicular to the farthest end of the high-speed signal line, determining placement positions and number according to the layout and routing position of the high-speed signal and the width of the noised power plane, and placing a pair of connection capacitors per 300 mils according to the width of the noised power plane. The connection capacitors are configured to connect the noised power plane and the ground. A pad of the capacitor should be within 80 mils from the furthest reference plane of the signal line to enhance a noise filtering effect. When the distance to the remote reference power plane of the signal line is about 1,200 mils, a total of four 300 mils, four pairs of capacitors are placed, and the capacitors are positioned about in the middle of each 300 mil.

Figure 5:
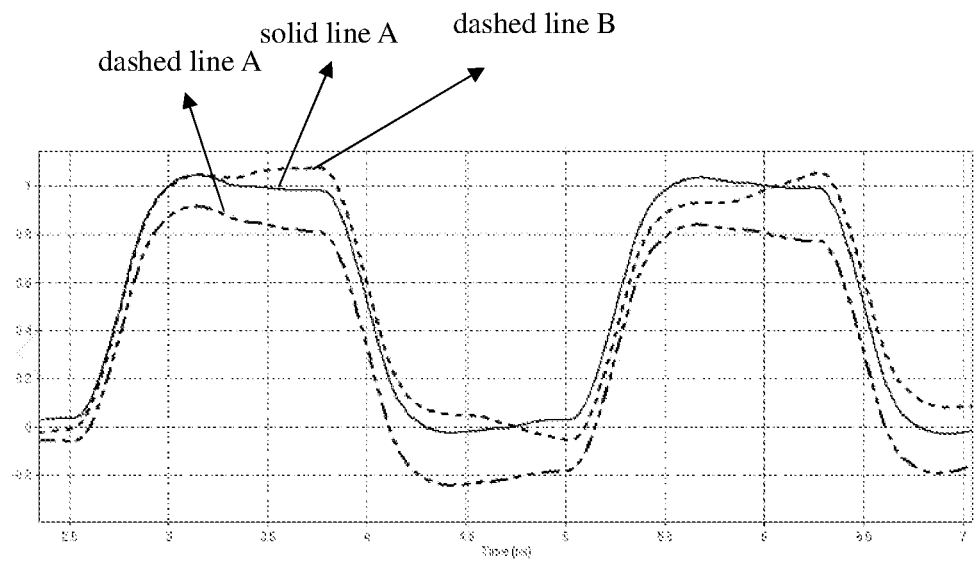
FIG. 5 illustrates a schematic diagram of a simulation result for reducing influence of a remote reference power noise on signal quality according to Embodiment 1 of the present application.

FIG. 5 illustrates a schematic diagram of a simulation result for reducing influence of a remote reference power noise on signal quality according to Embodiment 1 of the present application. A solid line A is a waveform of initial design when there is no noise on power plane 1, a dashed line A which deviates more is a waveform when there is a large noise on power plane 1 and a connection capacitor is not added, and a dashed line B which is closer to the solid line is a waveform when there is a large noise on power plane 1 and a connection capacitor is added. It can be seen that the waveform of a signal is greatly improved after the connection capacitor is added, and the influence on the signal quality is greatly reduced.

After the placement positions and number of connection capacitors are determined, a combination of capacitors of 0.01 μF and 0.1 μF is placed fixedly at each position for testing. If the distance between power plane 1 and power plane 2 is very close, power plane 1 has a large noise, but the noise is inevitable due to adjacency. At this moment, it is possible to add capacitors of 0.01 μF and 0.1 μF at the position where power plane 1 and power plane 2 are adjacent, so as to reduce the interference therebetween.

Figure 6:
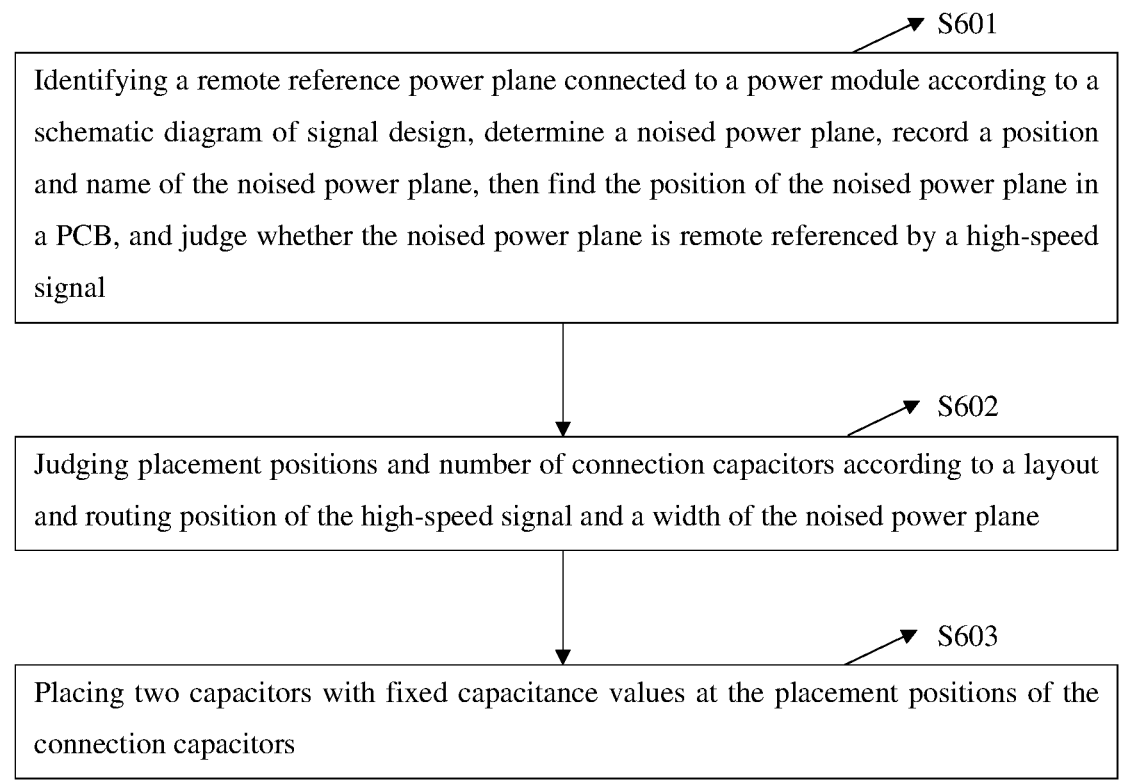
FIG. 6 illustrates a flow chart of a method for reducing influence of a remote reference power noise on signal quality according to Embodiment 1 of the present application.

FIG. 6 illustrates a flow chart of a method for reducing influence of a remote reference power noise on signal quality according to Embodiment 1 of the present application.

In step S601, a remote reference power plane connected to a power module is firstly identified according to a schematic diagram of signal design, a noised power plane is determined, and a position and name of the noised power plane are recorded. Then, the position of the noised power plane is found in a PCB, and whether the noised power plane is remote referenced by a high-speed signal is judged.

In step S602, placement positions and number of connection capacitors are judged according to a layout and routing position of the high-speed signal and a width of the noised power plane.

In step S603, two capacitors with fixed capacitance values are placed at the placement positions of the connection capacitors.

Figure 7:
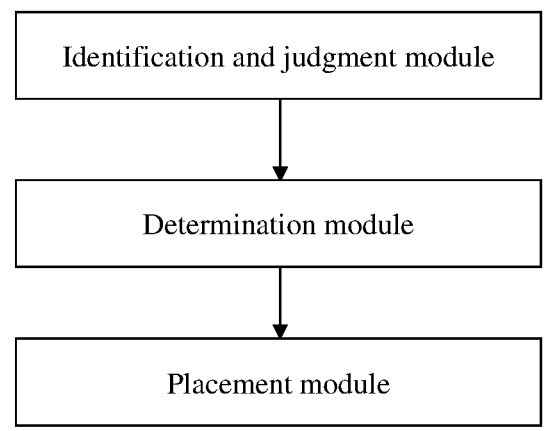
FIG. 7 illustrates a schematic diagram of a system for reducing influence of a remote reference power noise on signal quality according to Embodiment 1 of the present application.

Based on the method for reducing the influence of the remote reference power noise on the signal quality proposed by the present application, a system for reducing influence of a remote reference power noise on signal quality is also proposed. FIG. 7 illustrates a schematic diagram of a system for reducing influence of a remote reference power noise on signal quality according to Embodiment 1 of the present application. The system includes an identification and judgment module, a determination module and a placement module.

The identification and judgment module is configured to identify a remote reference power plane connected to a power module according to a schematic diagram of signal design, determine a noised power plane, find a position of the noised power plane in a PCB, and judge whether the noised power plane is remote referenced by a high-speed signal.

The determination module is configured to determine placement positions and number of connection capacitors according to a layout and routing position of the high-speed signal and a width of the noised power plane.

The placement module is configured to place two capacitors with fixed capacitance values at the placement positions of the connection capacitors.

The identification and judgment module includes an identification module and a judgment module.

The identification module is configured to identify a remote reference power plane connected to a power module according to a schematic diagram of signal design, and determine a noised power plane.

The judgment module is configured to find a position of the noised power plane in a PCB, and judge whether the noised power plane is remote referenced by a high-speed signal.

The determination module includes a first determination module and a second determination module.

The first determination module is configured to place, according to determined positions of a high-speed signal line and a remote reference plane, in order to ensure the quality of the high-speed signal line, connection capacitors on layer L1 within a range of 80 mils perpendicular to the farthest end of the high-speed signal line.

The second determination module is configured to place a pair of connection capacitors per 300 mils according to the width of the noised power plane. The connection capacitors are configured to connect the noised power plane and the ground.

The above content is merely an example and description for the structure of the present application. Those skilled in the art make various modifications or additions or similar substitutions to the specific embodiments described, which should all fall within the protection scope of the present application as long as they do not deviate from the structure of the present application or beyond the scope defined by the claims.

What is claimed is:

1. A method for reducing influence of a remote reference power noise on signal quality of a printed circuit board (PCB), the method comprising steps of:
   providing the PCB comprising at least one power plane connected to a power source and a power chip;
   identifying a remote reference power plane connected to the power source according to a schematic diagram of signal design, determining a noised power plane, finding a position of the noised power plane in the PCB, and judging whether the noised power plane is remote referenced by a high-speed signal;
   determining positions and a number of capacitors according to a layout and routing position of the high-speed signal and a width of the noised power plane; and
   placing two capacitors with fixed capacitance values at the positions of the capacitors,
   wherein the determining the noised power plane comprises measuring a voltage amplitude or a voltage oscillation where a voltage oscillates in a power plane directly connected to the power chip by an oscilloscope, and
   wherein the determining of the noise power plane is based on:
   an oscillating voltage of the voltage oscillation being greater than 10% of a voltage of the power chip,
   the voltage amplitude jumping and a rising edge rate being greater than 0.3 V/ns, or
   the voltage oscillation occurring during conversion and an oscillation frequency being between 100 kHz and 1 GHz.

2. The method according to claim 1, wherein the determining the noised power plane is based on the oscillating voltage being greater than 10% of the voltage of the power chip.

3. The method according to claim 1, wherein the determining the noised power plane is based on the voltage amplitude lumping and the rising edge rate being greater than 0.3 V/ns.

4. The method according to claim 1, wherein the determining the positions and the number of capacitors according to the layout and routing position of the high-speed signal and the width of the noised power plane comprises:
   placing, according to determined positions of a high-speed signal line and a remote reference plane, the capacitors on layer L1 within a range of 80 mils perpendicular to a farthest end of the high-speed signal line, and placing a pair of the capacitors per 300 mils according to the width of the noised power plane, the capacitors being configured to connect the noised power plane and a ground.

5. The method according to claim 4, further comprising:
   placing the capacitors beside the high-speed signal line,
   locating the capacitors on the layer L1 for connecting the remote reference power plane and the ground,
   locating the high-speed signal line on layer L7,
   locating the ground on layer L6, and
   locating the remote reference power plane on layer L8.

6. The method according to claim 1, wherein the two capacitors have fixed capacitance values of 0.01 µF and 0.1 µF, respectively.

7. The method according to claim 1, wherein the determining the noised power plane is based on the voltage oscillation occurring during conversion and the oscillation frequency being between 100 kHz and 1 GHz.

* * * * *